US012617134B2

(12) United States Patent
Kim

(10) Patent No.: US 12,617,134 B2
(45) Date of Patent: May 5, 2026

(54) COOLING PLATE INJECTION BONDING METHOD FOR ELECTRIC VEHICLE BATTERY CASE FRAME

(71) Applicant: Byungchan Kim, Busan (KR)

(72) Inventor: Byungchan Kim, Busan (KR)

( * ) Notice: Subject to any disclaimer, the term of this patent is extended or adjusted under 35 U.S.C. 154(b) by 96 days.

(21) Appl. No.: 18/786,132

(22) Filed: Jul. 26, 2024

(65) Prior Publication Data

US 2025/0144855 A1     May 8, 2025

(30) Foreign Application Priority Data

Nov. 2, 2023     (KR) ......................... 10-2023-0149892

(51) Int. Cl.
| | |
|---|---|
| *B29C 45/14* | (2006.01) |
| *B29C 45/04* | (2006.01) |
| *B29L 31/00* | (2006.01) |
| *B29L 31/18* | (2006.01) |

(52) U.S. Cl.
CPC ........ *B29C 45/14008* (2013.01); *B29C 45/04* (2013.01); *B29C 2045/14967* (2013.01); *B29L 2031/18* (2013.01); *B29L 2031/7146* (2013.01)

(58) Field of Classification Search
CPC ..... B29C 45/14; B29C 14/008; B29C 14/065; B29C 45/14467; B29C 45/14008; B29C 45/04; B29C 2045/14967; B29C 45/0062; B29C 45/14065; B29C 45/26; B29C 65/70; B29L 2031/18; B29L 2031/7146; Y02E 60/10; H01M 50/20; B60L 53/302; B60K 1/04
See application file for complete search history.

(56) References Cited

U.S. PATENT DOCUMENTS

2025/0144855 A1*     5/2025     Kim ........................ B29C 45/04

FOREIGN PATENT DOCUMENTS

| | | |
|---|---|---|
| DE | 19848516 A1 | 4/2000 |
| DE | 102015216029 A1 | 2/2017 |
| DE | 102018202475 A1 | 8/2019 |
| JP | 2010030298 A | 2/2010 |
| KR | 10-1277453 B1 | 6/2013 |

OTHER PUBLICATIONS

Translation of JP2011096465 (2011).*
Communication dated Apr. 1, 2025 issued by the German Patent Office in application No. 102024124340.6.

* cited by examiner

*Primary Examiner* — Sonya M Sengupta
(74) *Attorney, Agent, or Firm* — Sughrue Mion, PLLC

(57)     ABSTRACT

Disclosed is a method of bonding a battery case frame and a cooling plate in a process of producing an electric vehicle battery case, including a cooling plate preparation operation of preparing the electric vehicle battery case and the cooling plate and forming injection part fixing holes in the battery case and the cooling plate, a mold seating operation of temporarily assembling the electric vehicle battery case and the cooling plate, seating the temporarily assembled electric vehicle battery case and cooling plate in an injection mold, and forming an injection molding space communicating with the injection part fixing holes and having a predetermined volume, an injection operation of filling the injection molding space of the injection mold and the injection part fixing holes with a preset injection material, and a bonding completion operation of separating the electric vehicle battery case from the injection mold.

6 Claims, 10 Drawing Sheets

COOLING PLATE INJECTION BONDING METHOD(S100)

COOLING PLATE PREPARATION OPERATION(S110)

MOLD SEATING OPERATION (S120)

INJECTION OPERATION (S130)

BONDING COMPLETION OPERATION (S140)

MOLD SEATING OPERATION(S120)

FIXING GROOVE ALIGNING OPERATION(S121)

INJECTION MOLD INSERTION OPERATION(S122)

INJECTION MOLD LOCATION FIXING OPERATION(S123)

COOLING PLATE INJECTION BONDING METHOD FOR ELECTRIC VEHICLE BATTERY CASE FRAME

CROSS-REFERENCE TO RELATED APPLICATIONS

This application claims priority from Korean Patent Application No. 10-2023-0149892, filed on Nov. 2, 2023 in the Korean Intellectual Property Office, the disclosure of which is incorporated herein by reference in its entirety.

BACKGROUND

1. Field

The following description relates to a cooling plate injection bonding method, and more specifically, to a cooling plate injection bonding method for an electric vehicle battery case frame.

2. Description of Related Art

In a process of producing an electric vehicle battery case, a battery case frame and a cooling plate are bonded by welding as illustrated in FIG. 1.

Specifically, an electric vehicle battery case frame formed of an aluminum material is bonded to a cooling plate by friction stir welding (FSW).

Since a product is deformed due to a high pressure and rotation which are characteristics of the FSW during production, there are problems that dimensions of the product are incorrect due to the existing method, and a high investment cost for an FSW welding apparatus is incurred.

Accordingly, there is a need for a technology for solving the problems due to the above-described conventional technology.

Patent Document (Patent Document 1) Korean Registered Patent Publication No. 10-1277453 (Date of Registration: Jun. 17, 2013)

SUMMARY

Embodiments of the present invention are directed to providing a cooling plate injection bonding method capable of improving process efficiency by changing a bonding process of a battery case frame and a cooling plate in a process of producing an electric vehicle battery case frame and reducing a production cost and improving quality by improving a structure.

In one aspect of the present invention, a cooling plate injection bonding method for an electric vehicle battery case frame is a method of bonding a battery case frame and a cooling plate in a process of producing an electric vehicle battery case and includes a cooling plate preparation operation of preparing the electric vehicle battery case and the cooling plate and forming injection part fixing holes in the battery case and the cooling plate, a mold seating operation of temporarily assembling the electric vehicle battery case and the cooling plate, seating the temporarily assembled electric vehicle battery case and cooling plate in an injection mold, and forming an injection molding space communicating with the injection part fixing holes and having a predetermined volume, an injection operation of filling the injection molding space of the injection mold and the injection part fixing holes with a preset injection material, and a bonding completion operation of separating the electric vehicle battery case from the injection mold.

In one embodiment of the present invention, the cooling plate preparation operation may include a first fixing hole forming operation of forming first fixing holes recessed in the electric vehicle battery case to a predetermined depth from portions of the cooling plate in contact with the electric vehicle battery case in a vertical direction of the electric vehicle battery case and consecutively formed along an edge of an upper end surface of the electric vehicle battery case.

In one embodiment of the present invention, the cooling plate preparation operation may include a second fixing hole forming operation of forming a plurality of second fixing holes which are consecutively formed in the cooling plate in contact with an upper surface of the electric vehicle battery case at locations corresponding to the first fixing holes and spaced a predetermined interval from each other along the edge of the upper end surface of the electric vehicle battery case.

In one embodiment of the present invention, the mold seating operation may include a fixing hole aligning operation of mounting the cooling plate on the upper surface of the electric vehicle battery case, aligning locations of the first fixing holes and the second fixing holes, and fixing the first fixing holes and the second fixing holes.

In one embodiment of the present invention, the mold seating operation may include an injection mold insertion operation of seating the cooling plate and the electric vehicle battery case in the injection mold in a form in which the cooling plate surrounds the upper surface of the electric vehicle battery case and an injection mold location fixing operation of fixing a location of the injection mold such that an upper surface of the cooling plate is spaced a preset distance from an inner upper surface of the injection mold.

DETAILED DESCRIPTION

Hereinafter, exemplary embodiments of the present invention will be described in more detail with reference to the accompanying drawings. Moreover, terms and words used in the present specification and claims should not be interpreted as being limited to commonly used meanings or meanings in dictionaries and should be interpreted as having meanings and concepts which are consistent with the technological scope of the invention.

Throughout this specification, when a first member is referred to as being "on" a second member, the first member is in contact with the second member or a third member is interposed between the two members. Throughout this specification, when a certain part "includes" a certain component, other components are not excluded unless explicitly described otherwise, and other components may further be included therein.

Figure 1:
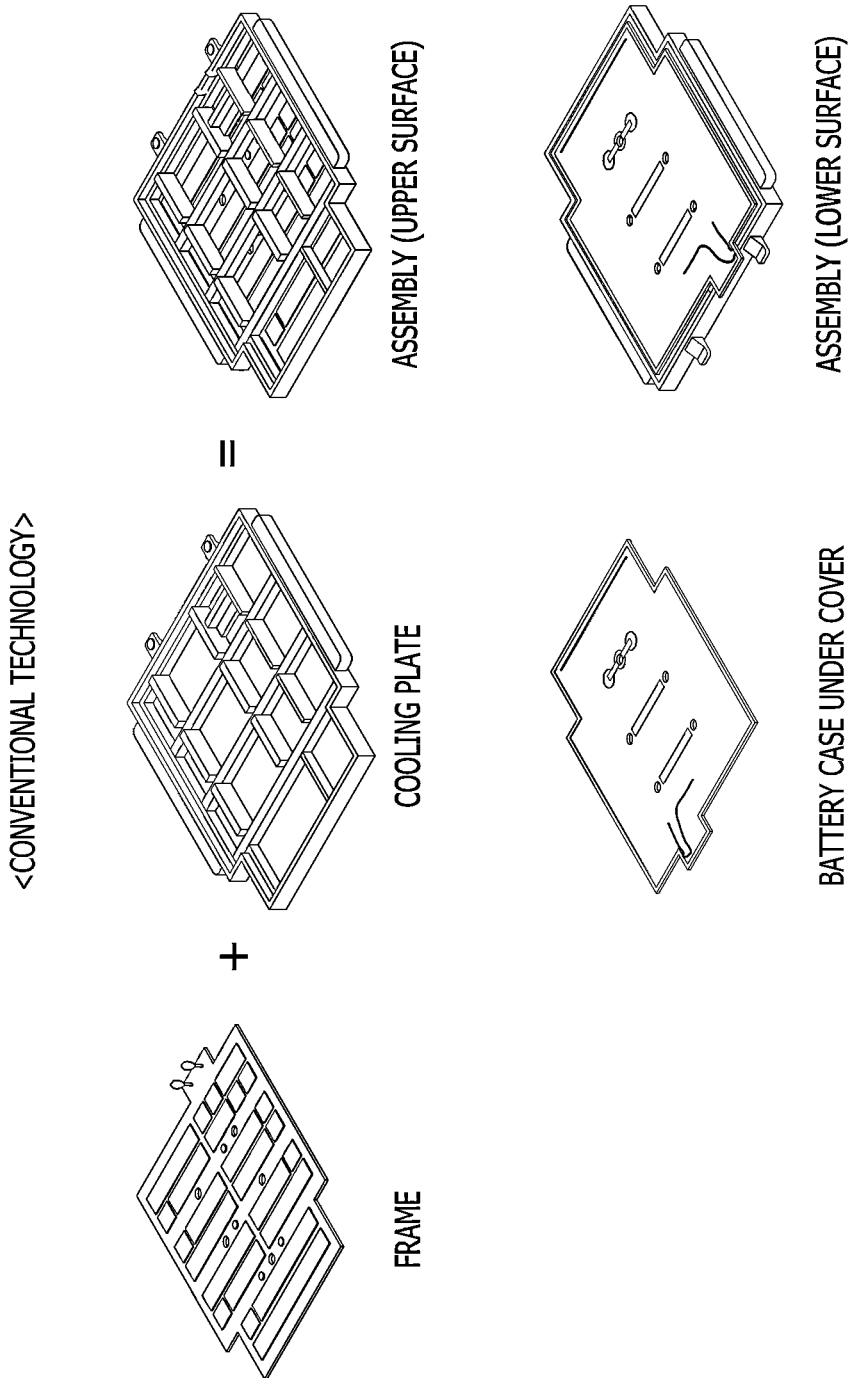
FIG. 1 is a schematic view illustrating a process of bonding a battery case frame and a cooling plate in a process of producing an electric vehicle battery case.
Figure 2:
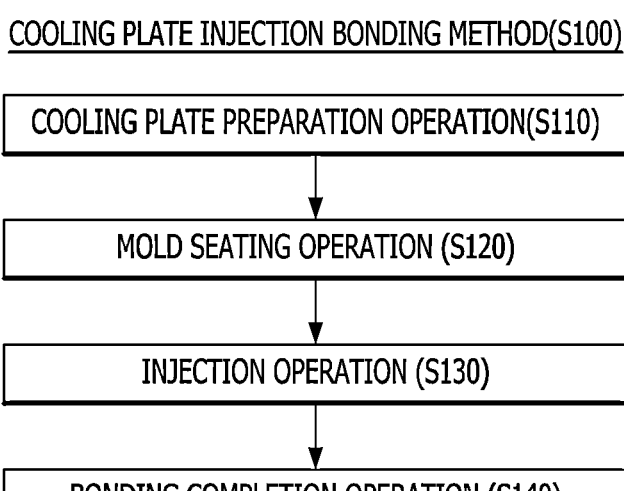
FIG. 2 is a flowchart illustrating a cooling plate injection bonding method according to one embodiment of the present invention.

In FIG. 2, a cooling plate injection bonding method according to one embodiment of the present invention is illustrated.

Referring to FIG. 2, the cooling plate injection bonding method S100 according to the present embodiment is a method of bonding a battery case frame and a cooling plate 120 in a process of producing an electric vehicle battery case 110 and includes a cooling plate preparation operation S110, a mold seating operation S120, an injection operation S130, and a bonding completion operation S140 in which specific processes are performed, and thus the cooling plate injection bonding method S100 capable of improving process efficiency by changing a process of bonding the battery case frame and the cooling plate 120 in the process of producing the electric vehicle battery case 110 and reducing a production cost and improving quality by improving a structure may be provided.

Hereinafter, each operation constituting the cooling plate injection bonding method S100 according to the present embodiment will be described in detail with reference to the accompanying drawings.

Figure 3:
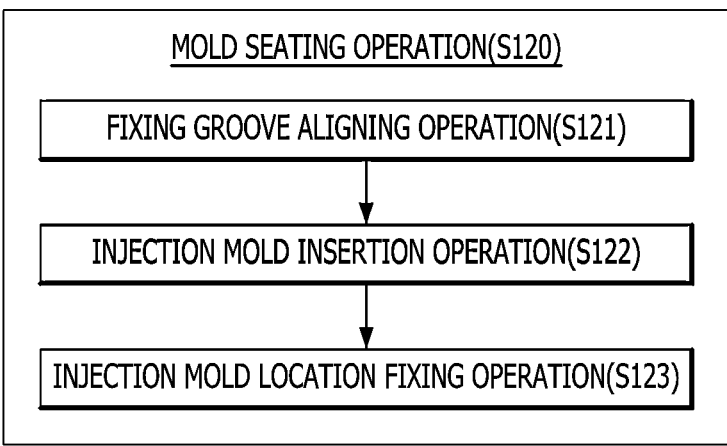
FIG. 3 is a flowchart specifically illustrating a mold seating operation of the cooling plate injection bonding method of FIG. 2.
Figure 4:
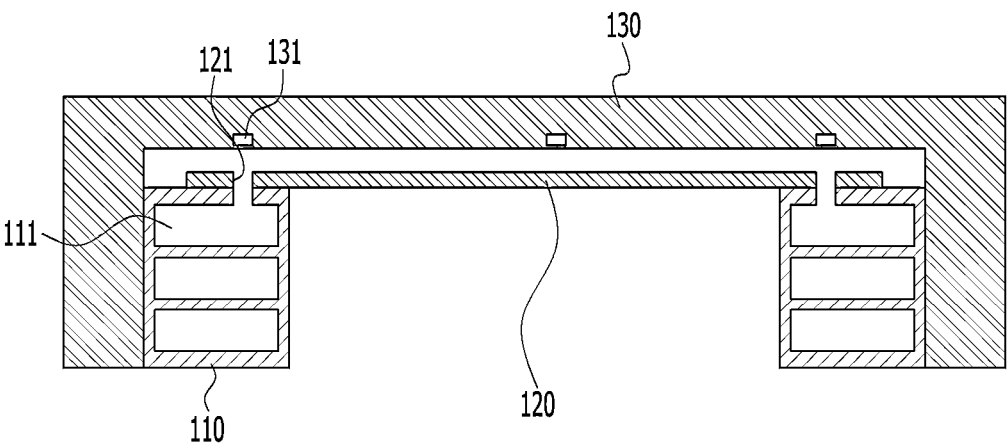
FIG. 4 is a cross-sectional view illustrating an electric vehicle battery case, a cooling plate, and an injection mold which are prepared through the cooling plate injection bonding method according to one embodiment of the present invention of FIG. 2.
Figure 4:
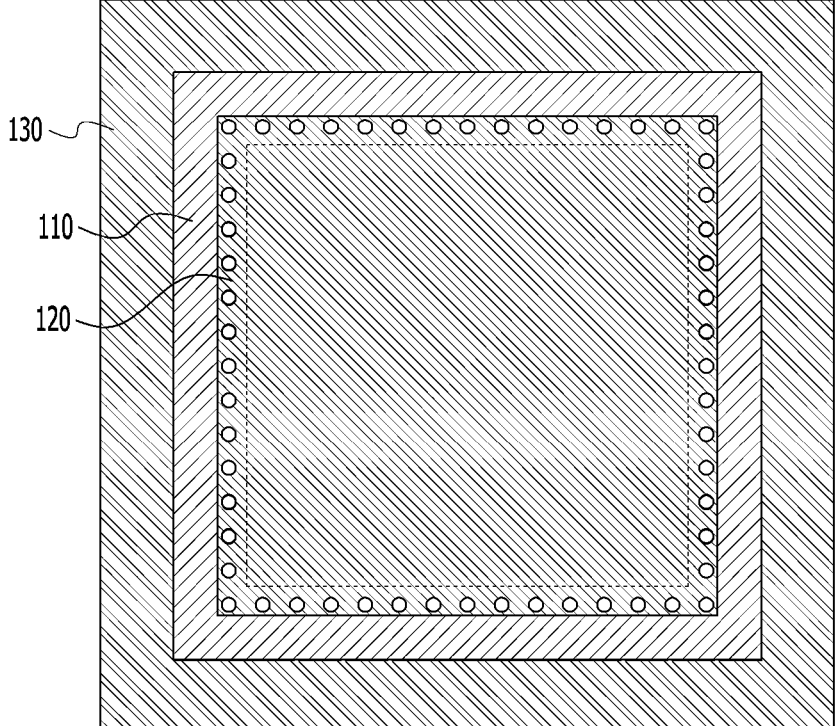
Figure 5:
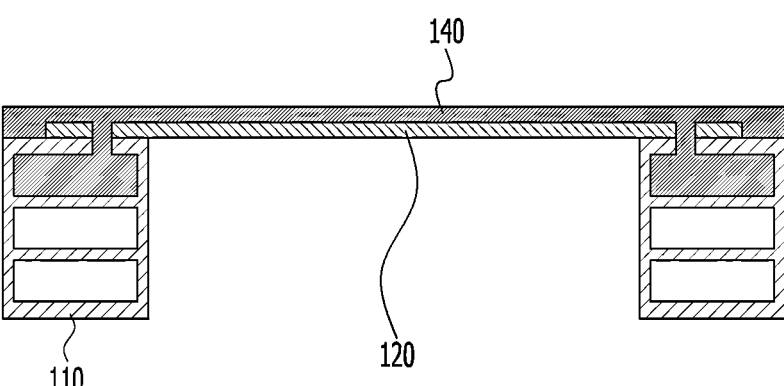
FIG. 5 is a cross-sectional view illustrating a cooling plate injection bonding structure completed using the structure illustrated in FIG. 4.
Figure 6:
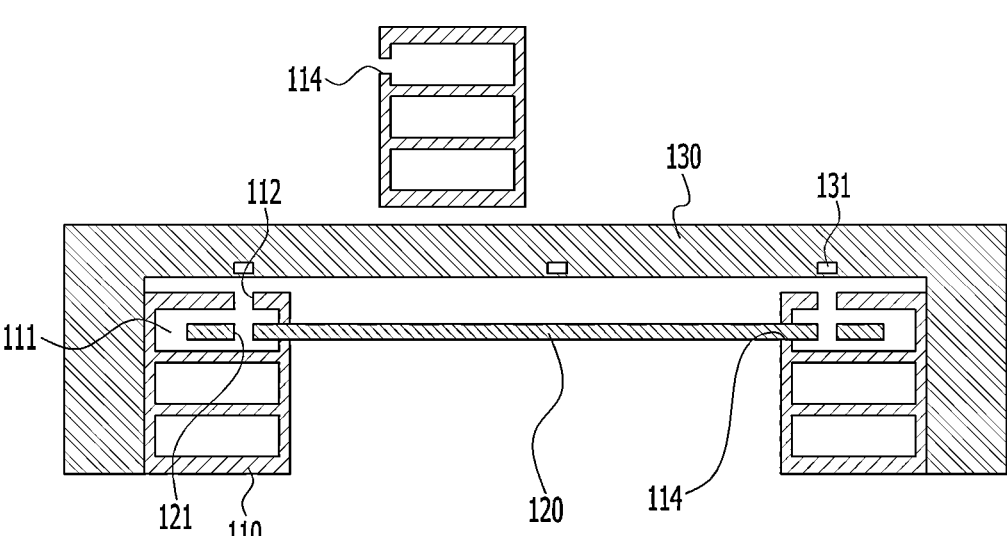
FIG. 6 is a cross-sectional view illustrating an electric vehicle battery case, a cooling plate, and an injection mold which are prepared through a cooling plate injection bonding method according to another embodiment of the present invention of FIG. 2.
Figure 7:
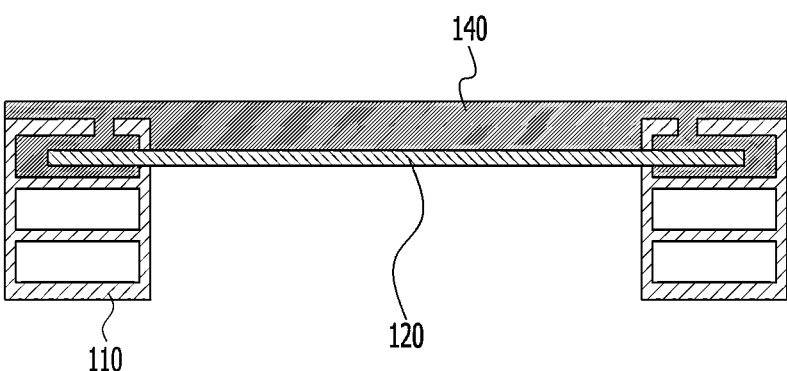
FIG. 7 is a cross-sectional view illustrating a cooling plate injection bonding structure completed using the structure illustrated in FIG. 6.
Figure 8:
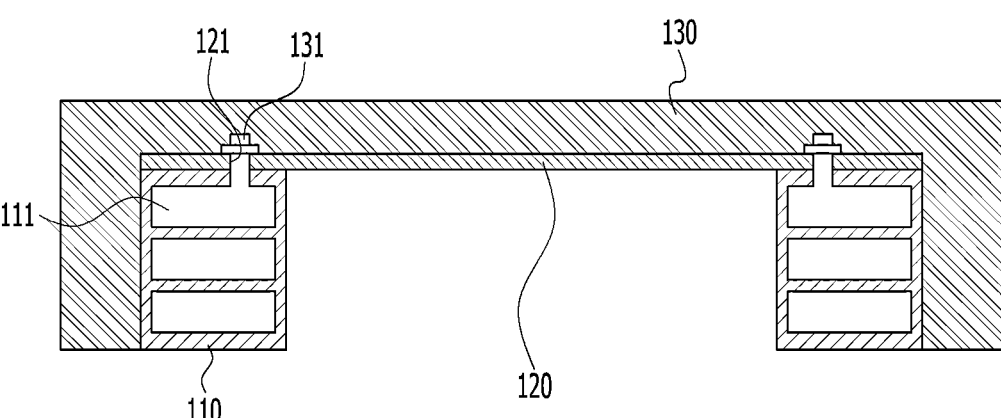
FIG. 8 is a cross-sectional view illustrating an electric vehicle battery case, a cooling plate, and an injection mold which are prepared through a cooling plate injection bonding method according to still another embodiment of the present invention of FIG. 2.
Figure 9:
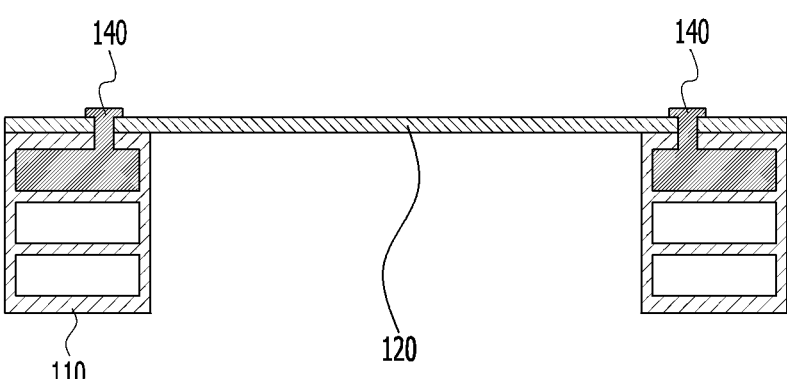
FIG. 9 is a cross-sectional view illustrating a cooling plate injection bonding structure completed using the structure illustrated in FIG. 8.

In FIG. 3, a flowchart specifically illustrating the mold seating operation of the cooling plate injection bonding method of FIG. 2 is illustrated, and in FIGS. 4 to 11, schematic views corresponding to processes are illustrated.

Referring to the drawings, in the cooling plate preparation operation S110 according to the present embodiment, a process of preparing the electric vehicle battery case 110 and the cooling plate 120 and forming injection part fixing holes in the battery case and the cooling plate 120 is performed.

Specifically, the cooling plate preparation operation S110 may include a first fixing hole forming operation S111 and a second fixing hole forming operation S113. In the first fixing hole forming operation S111, a process of forming first fixing holes 111 recessed in the electric vehicle battery case 110 to a predetermined depth from portions of the cooling plate 120 in contact with the electric vehicle battery case 110 in a vertical direction of the electric vehicle battery case 110 and consecutively formed along an edge of an upper end surface of the electric vehicle battery case 110 is performed. In the second fixing hole forming operation S113, a process of forming a plurality of second fixing holes which are consecutively formed in the cooling plate 120 in contact with an upper surface of the electric vehicle battery case 110 at locations corresponding to the first fixing holes 111 and spaced a predetermined interval from each other along the edge of the upper end surface of the electric vehicle battery case 110 is performed.

In the mold seating operation S120 according to the present embodiment, a process of temporarily assembling the electric vehicle battery case 110 and the cooling plate 120, seating the temporarily assembled electric vehicle battery case 110 and cooling plate 120 in an injection mold 130, and forming an injection molding space communicating with the injection part fixing holes and having a predetermined volume is performed.

Specifically, the mold seating operation S120 according to the present embodiment may include a fixing hole aligning operation S121, an injection mold insertion operation S122, and an injection mold location fixing operation S123 in which specific processes are performed. In the fixing hole aligning operation S121, a process of mounting the cooling plate 120 on the upper surface of the electric vehicle battery case 110, fixing the cooling plate using a fixing gap 114 of the electric vehicle battery case 110, aligning locations of the first fixing holes 111 and the second fixing holes 121, and fixing the first fixing holes 111 and the second fixing holes 121 is performed. In the injection mold insertion operation S122, a process of seating the cooling plate 120 and the electric vehicle battery case 110 in the injection mold 130 in a form in which the cooling plate 120 surrounds the upper surface of the electric vehicle battery case 110 on which the cooling plate 120 is mounted is performed such that the cooling plate 120 serves as a protection cover for the upper surface of the electric vehicle battery case 110. In the injection mold location fixing operation S123, a process of fixing a location of the injection mold 130 such that an upper surface of the cooling plate 120 is spaced a preset distance from an inner upper surface of the injection mold 130 is performed.

In the injection operation S130 according to the present embodiment, a process of seating the cooling plate 120 and the electric vehicle battery case 110 in the injection mold 130 in a form in which the cooling plate 120 surrounds the upper surface of the electric vehicle battery case 110 on which the cooling plate 120 is mounted is performed such that the cooling plate 120 serves as a protection cover for the upper surface of the electric vehicle battery case 110.

In the bonding completion operation S140 according to the present embodiment, a process of separating the electric vehicle battery case 110 from the injection mold 130 is performed.

In each structure disclosed in FIGS. 4 to 7, 10, and 11, as an injection part protects a cooling plate 120, a separate under cover is not required. Conversely, in a structure disclosed in FIGS. 8 and 9, a separate under cover which protects a cooling plate 120 is required.

Figure 10:
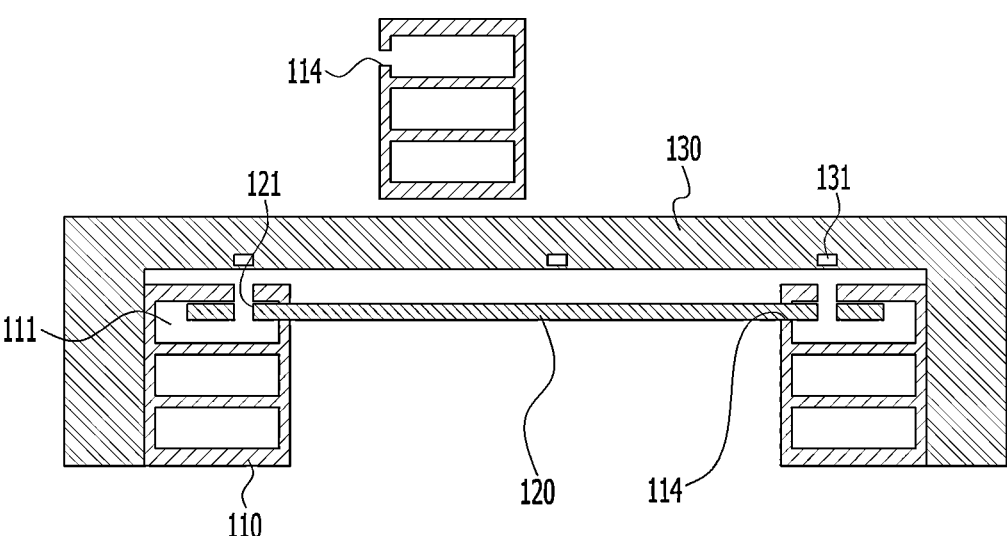
FIG. 10 is a cross-sectional view illustrating an electric vehicle battery case, a cooling plate, and an injection mold which are prepared through a cooling plate injection bonding method according to yet another embodiment of the present invention of FIG. 2.
Figure 11:
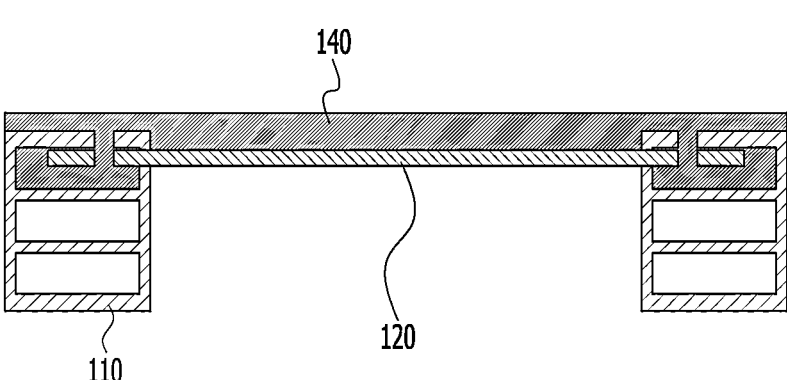
FIG. 11 is a cross-sectional view illustrating a cooling plate injection bonding structure completed using the structure illustrated in FIG. 10.

In FIG. 10, a cross-sectional view showing an electric vehicle battery case, a cooling plate, and an injection mold which are prepared through a cooling plate injection bonding method according to yet another embodiment of the present invention is illustrated, and in FIG. 11, a cross-sectional view showing a cooling plate injection bonding structure completed using the structure illustrated in FIG. 10 is illustrated.

Referring to the drawings, an injection mold 130 according to the present embodiment may have a structure surrounding both an outer circumferential surface of an electric vehicle battery case 110 and an outer circumferential surface of a cooling plate 120. In this case, an injection material injected through an injection gate 131 of an injection mold 130 may be injected on the outer circumferential surface of the electric vehicle battery case 110 and an upper surface of the cooling plate 120 to form a structure and fix the cooling plate 120 to the electric vehicle battery case 110 at the same time.

In this case, a fixing gap 140 for fixing the cooling plate 120 may be formed in a frame of the electric vehicle battery case 110 having an aluminum profile structure so that the cooling plate 120 and the frame of the electric vehicle battery case 110 may be stably fixed.

In this case, an injection part may surround the aluminum frame and fill an inner portion of the frame having the profile structure to improve the strength of the entire structure, prevent leakage, and secure a stable bonding state between the frames. In other words, the injection part may serve to couple the frames, serve as an under cover, and serve to couple the cooling plate.

As described above, according to a cooling plate injection bonding method S100 for an electric vehicle battery case frame of the present invention, as a cooling plate preparation operation S110, a mold seating operation S120, an injection operation S130, and a bonding completion operation S140 are provided, the cooling plate injection bonding method S100 capable of improving process efficiency by changing a process of bonding the battery case frame and the cooling plate 120 in a process of producing the electric vehicle battery case 110 and reducing a production cost and improving quality by improving the structure can be provided.

As described above, according to a cooling plate injection bonding method for an electric vehicle battery case frame of the present invention, as a cooling plate preparation operation, a mold seating operation, an injection operation, and a bonding completion operation in which specific processes are performed are provided, the cooling plate injection bonding method capable of fundamentally preventing a problem due to welding deformation, improving process efficiency by changing a process of bonding a battery case frame and a cooling plate in a process of producing an electric vehicle battery case, and as a result, reducing a production cost and improving quality by improving a structure can be provided.

In the above detailed description of the present invention, only specific embodiments according thereto have been described. However, it should be understood that the present invention is not limited to the specific embodiments described in the detailed description, and all changes, equivalents, and substitutes falling within the spirit and technical scope of the present invention are encompassed in the present invention.

Accordingly, the present invention is not limited to the above-described specific embodiments and descriptions and may be variously modified by those skilled in the art without departing from the gist of the invention claimed by the appended claims, and the modifications are within the scope of the claims.

What is claimed is:

1. A cooling plate injection bonding method of bonding a battery case frame and a cooling plate (120) in a process of producing an electric vehicle battery case (110), the cooling plate injection bonding method comprising:

a cooling plate preparation operation (S110) of preparing the electric vehicle battery case (110) and the cooling plate (120) and forming injection part fixing holes in the battery case and the cooling plate (120);

a mold seating operation (S120) of temporarily assembling the electric vehicle battery case (110) and the cooling plate (120), seating the temporarily assembled electric vehicle battery case (110) and cooling plate (120) in an injection mold (130), and forming an injection molding space communicating with the injection part fixing holes and having a predetermined volume;

an injection operation (S130) of filling the injection molding space of the injection mold (130) and the injection part fixing holes with a preset injection material; and a bonding completion operation (S140) of separating the electric vehicle battery case (110) from the injection mold (130).

2. The cooling plate injection bonding method of claim 1, wherein the cooling plate preparation operation (S110) includes a first fixing hole forming operation (S111) of forming first fixing holes (111) recessed in the electric vehicle battery case (110) to a predetermined depth from portions of the cooling plate (120) in contact with the electric vehicle battery case (110) in a vertical direction of the electric vehicle battery case (110) and consecutively formed along an edge of an upper end surface of the electric vehicle battery case (110).

3. The cooling plate injection bonding method of claim 2, wherein the cooling plate preparation operation (S110) includes a second fixing hole forming operation (S113) of forming a plurality of second fixing holes which are consecutively formed in the cooling plate (120) in contact with an upper surface of the electric vehicle battery case (110) at locations corresponding to the first fixing holes (111) and spaced a predetermined interval from each other along the edge of the upper end surface of the electric vehicle battery case (110).

4. The cooling plate injection bonding method of claim 3, wherein the mold seating operation (S120) includes a fixing hole aligning operation (S121) of mounting the cooling plate (120) on the upper surface of the electric vehicle battery case (110), fixing the cooling plate using a fixing gap (114) of the electric vehicle battery case (110), aligning locations of the first fixing holes (111) and the second fixing holes (121), and fixing the first fixing holes (111) and the second fixing holes (121).

5. The cooling plate injection bonding method of claim 4, wherein the mold seating operation (S120) includes:

an injection mold insertion operation (S122) of seating the cooling plate (120) and the electric vehicle battery case (110) in the injection mold (130) in a form in which the cooling plate (120) surrounds the upper surface of the electric vehicle battery case (110) on which the cooling plate (120) is mounted such that the cooling plate (120) serves as a protection cover for the upper surface of the electric vehicle battery cover (110); and an injection mold location fixing operation (S123) of fixing a location of the injection mold (130) such that an upper surface of the cooling plate (120) is spaced a preset distance from an inner upper surface of the injection mold (130).

6. The cooling plate injection bonding method of claim 5, wherein, in the injection operation (S130):

the upper surface of the cooling plate (120) and the fixing gap (114) are injection bonded; and the injection molding space of the injection mold (130) and the injection part fixing holes are filled with a preset injection material, and the fixing gap (114) is filled with the injection material at the same time.

* * * * *